June 3, 1958     D. GRAY     2,837,739
SENSE ANTENNA SYSTEM

Filed July 12, 1954     2 Sheets-Sheet 1

Inventor:
Dudley Gray
Benjamin F. Nupper
Attorney

June 3, 1958

D. GRAY 2,837,739

SENSE ANTENNA SYSTEM

Filed July 12, 1954

Inventor:
Dudley Gray
Benjamin F. Hupper
Attorney

United States Patent Office 2,837,739
Patented June 3, 1958

2,837,739

SENSE ANTENNA SYSTEM

Dudley Gray, Chicago, Ill., assignor to Stewart-Warner Corporation, Chicago, Ill., a corporation of Virginia Application July 12, 1954, Serial No. 442,826

11 Claims. (Cl. 343—114)

This invention relates to radio direction-finding apparatus.

Its purpose is to provide apparatus having an unambiguous sense or directional response operative over a wide range of signal frequencies and to avoid erroneous or distorted indications arising as the result of different antenna characteristics at different frequencies. More specifically, the purpose is to compensate for different response characteristics of a sense antenna system mounted on a mast. It has particular applicability in frequency ranges at and above about 3 megacycles per second.

Figure 1:
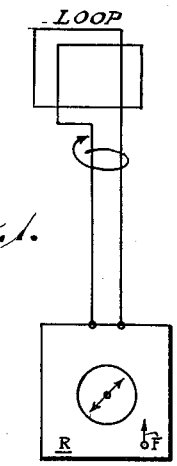
Fig. 1 is a schematic circuit diagram of a conventional loop-antenna direction finder.

Fig. 1 shows a conventional loop antenna direction finding system. The loop may be rotatable manually or automatically to locate a null point through the response of receiver R, which may give either an aural or visual signal. Or the loop may be continuously rotating and provide a visual signal either through an appropriate pointer hand or through a pattern established on the screen of a cathode ray tube. A number of circuit systems for such indications are known, and inasmuch as they are not a part of this invention no detailed description of them is provided here. One satisfactory circuit system is that disclosed, for example, in Lockhart Patent No. 2,656,536, issued October 20, 1953, for "Oscillographic Plotting System," particularly Fig. 3 thereof.

Such direction finding systems may be used either to indicate the direction of an originating transmitter or, as in radar apparatus, to indicate the direction of an object such as an airplane from which signals are reflected. While different systems may be employed in the two different applications, the directional antenna system of this invention may be used for either. Therefore, when reference is made to a source of radiated signals, this may refer either to an originating source or to an electrically reflective object.

It is a characteristic of a simple, conventional loop system that its response or indication is ambiguous. The same response will be indicated whether the detected signal is in a given direction or in the opposite direction. Thus, there is always the possibility of an error of 180°, and in many situations this is not easy to rectify by other intelligence. This may be particularly troublesome in the operation of automatic equipment. The deficiency of this type system is indicated in Fig. 1 by the double-ended pointer on the indicator dial.

In the drawings, the knob and pointer F indicate any appropriate means for setting the frequency response or tuning of the receiver system.

Figure 2:
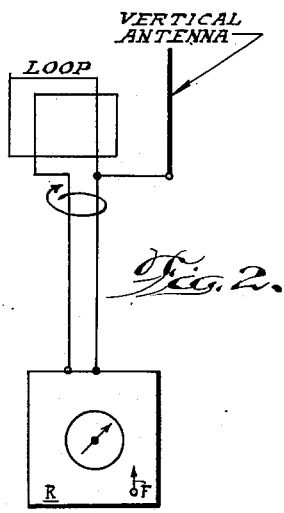
Fig. 2 is a schematic circuit diagram of a loop antenna coupled with a vertical sense antenna in a direction finder.

Fig. 2 illustrates a more or less conventional system for overcoming the 180° ambiguity of the system of Fig. 1. The loop is supplemented by a nearby vertical antenna, called a "sense antenna," and its received signal is combined with that of the loop in such a way that the phase difference between the loop signal and the vertical antenna signal is altered as between one radiated signal and another one from the opposite direction. The total combined signal can then be used; for example, with a rotating loop; to trace a pattern on a cathode ray screen which gives a positive and unambiguous reading. This much is also well known in the art.

It is sometimes necessary to mount such a sense antenna including the loop and the vertical antenna on a mast. This may be the case on shipboard or in any situation where the radio frequencies used are such that the range of reliable reception is enhanced by the height of the receptor antenna system. Usually, the loop antenna will be housed in a plastic dome atop the mast. The vertical sense antenna may be mounted inside or outside of the dome.

But when a mast is used, new problems arise. The mast or the interconnecting wires or cables will then resonate to received signals and thus establish a potential at the mast tip, the magnitude of which depends upon the electrical height of the mast with respect to the frequency being received. This potential cannot be isolated and leads to a distortion of the relationship (both in magnitude and phase) between the signal of the vertical antenna and that of the loop. The result is to produce indications which are indeterminate or false. Since the use of a mast is a practical necessity under many conditions, it is important to overcome the errors which it causes.

Figure 3:
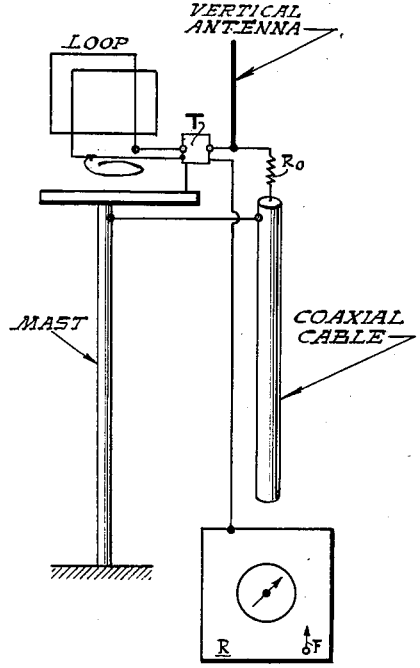
Fig. 3 is a schematic circuit diagram of a mast-mounted sense antenna system with the compensation system of this invention.

This invention provides a means of doing this. In its simplest form, as shown in Fig. 3, a length of coaxial cable is coupled to the sense antenna through a resistor $R_0$. The inner conductor is connected to the resistor, the outer cable to the upper end of the mast. The other end of the cable is open. The length of the cable is critical and, as a practical matter, it will be cut first to approximate the length desired (but always on the long side) and then trimmed so that it will resonate at or near the same frequency and condition as one of the resonant frequencies of the mast.

In a typical installation, a 31-foot mast was found to resonate as a ¼-wave resonator at 6.5 megacycles, as a ½-wave resonator at 13.5 megacycles, as a ¾-wave resonator at 20 megacycles, and as a full-wave resonator at 28 megacycles. The coaxial cable was then trimmed to resonate as a ½-wave resonator at 13.5 megacycles. The actual physical length of the cable will vary from one cable to another depending upon the propagation rate of the particular cable used.

The phase relationship of the resonance of the coaxial cable to the mast is such that the voltages of the mast are adjusted or corrected by those of the cable.

While the length of the cable assures the proper phase relation between the mast voltage and the loop signal, the relative amplitudes may not be appropriately matched, and the resistor $R_0$ is provided to permit proper adjustment.

At odd multiples of ¼-wave lengths of the cable the resistor may be thought of as connected directly to the top of the mast at peak voltages, and thus the mast voltage peaks are reduced by the "loading" action of the cable. At even multiples of ¼-wave lengths the resistor may be thought of as completely disconnected from the mast. This will coincide with the valleys of the mast tip voltage where only phase correction is needed or desired.

Two problems remain. The amplitudes of mast voltage peaks and contra-resonant cable voltage peaks may not be equally well balanced at all of the several odd multiples of ¼-wave lengths to be used. Thus, different values of resistor $R_0$ may be needed at the different odd multiples.

Figure 4:
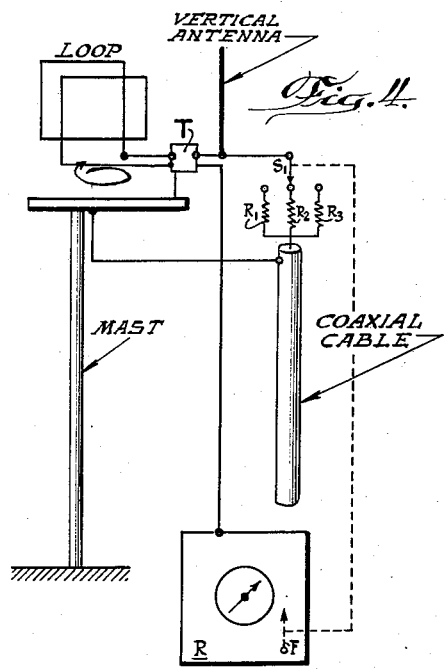
Fig. 4 is a schematic circuit diagram of a sense antenna with the compensation system of this invention adapted for several different frequency ranges.

An arrangement embodying a plurality of alternative resistors is shown in Fig. 4. The appropriate resistor R1, R2, or R3 is selected by a switch S1.

Figure 5:
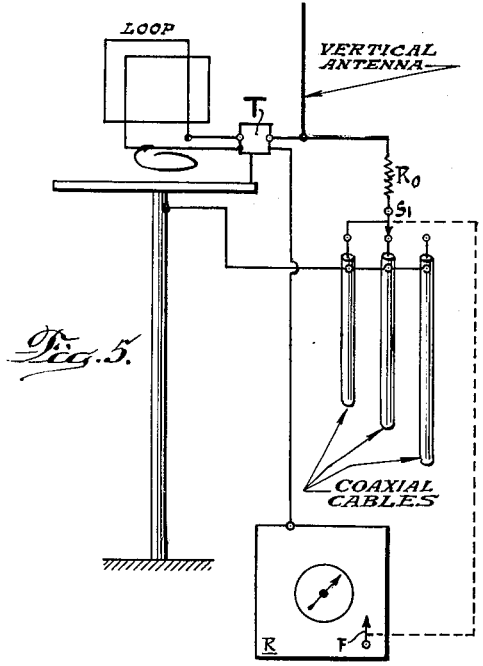
Figs. 5 and 6 are schematic circuit diagrams showing variant forms of the invention.
Figure 6:
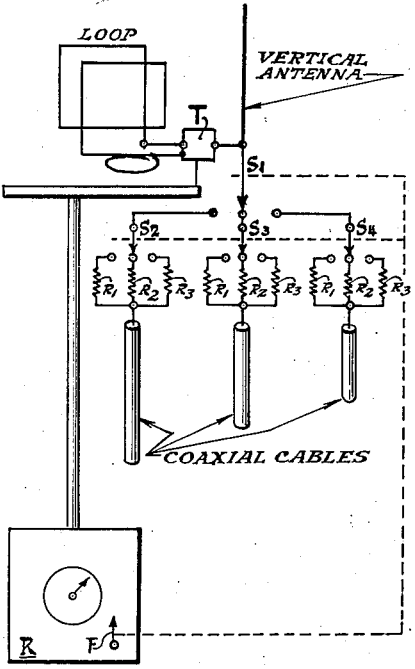
Figure 7:
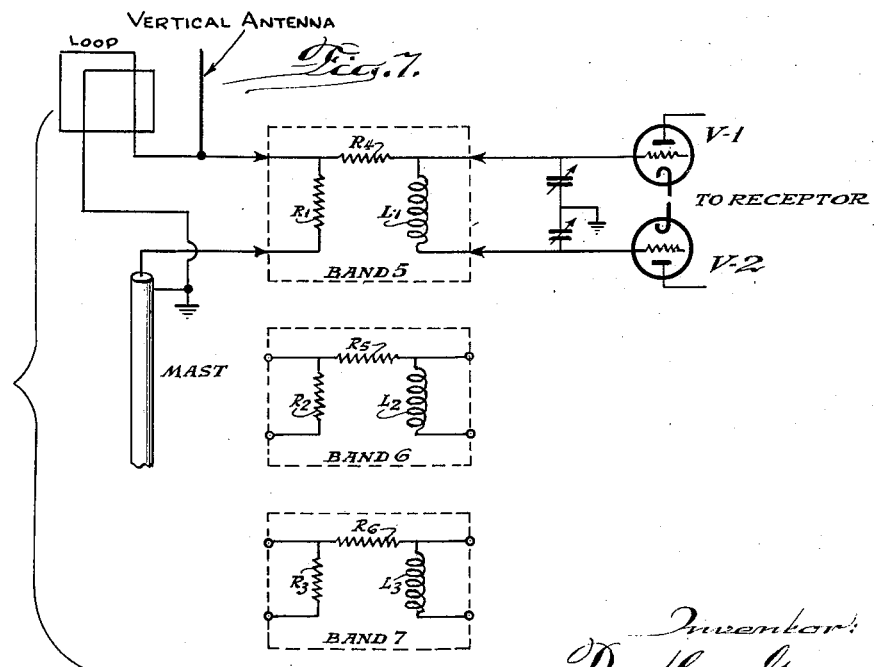
Fig. 7 is a fragmentary circuit diagram showing a mode of connecting the compensated sense antenna system into a receiver.

In practice, the switching of frequencies in the receptor may be accomplished by a turret tuner assembly like that of Fig. 7. This may be adapted for mounting in or near the dome atop the mast and will be arranged for remote control by suitable switch selectors and servo motors or by mechanical interconnection. The various tuning units may then contain resistors R1, R2, and R3 so that when frequency is changed the appropriate resistor is provided to couple the mast and the coaxial cable to bring about the desired amplitude relationship. In Figs. 4, 5, and 6 such tuning units, mounted on the mast, are designated T. There is also shown in each of these figures the conventional dotted line linking the frequency selector of the receptor with the switching system of the sense antenna compensating circuits. This is to indicate that by one means or another the switching of the compensating circuits is to be tied automatically to whatever means is used for frequency selection. If the turret tuning system of Fig. 7 is used, the interconnection should be regarded as extended to the tuners T which then embody the resistors R1, R2, and R3.

The second problem arises from the fact that the electrical length of the mast may not bear a linear relationship to the physical length of the mast for different frequencies of received signals. A cable adjusted to the ½-wave resonance of the mast may not sufficiently compensate for resonances of greater wave length of the mast. It then becomes necessary to substitute for the first cable a second cable resonating at a higher even ¼-wave length multiple, for high masts, and possibly a third or more for still higher frequencies.

To overcome this, different lengths of coaxial cable may be used over the range of frequencies to be received. For example, if a mast was resonant at ½-wave at, say, 6 megacycles, and then again at 1½-wave at, say, 17 megacycles (instead of 18 megacycles) a coaxial cable which would function properly at ½-wave might not do so at 1½-wave because it functions in more ideal form than the mast. Accordingly, two cables will be provided; one resonant at 6 megacycles at ½-wave and another resonant at 17 megacycles at ½-wave. For a range of frequencies, several cables may be provided as shown in Fig. 5, and switching means S1 to connect the appropriate cable for the frequency range being received are provided.

The systems of Fig. 4 and Fig. 5 may be combined as shown in Fig. 6. Several (here three) coaxial cables are provided. Switch S1 selects the cable to be connected. Switch S2, S3, or S4 then selects the appropriate resistor for coupling. The switches are interconnected to the frequency selector so that for each frequency the proper cable and the appropriate balance resistor for that cable are connected. As frequency ranges are selected near the even multiples of ¼-wave length resonance, one of the cables whose resonance matches that of the mast at the particular even multiple frequency is selected by switch S1. As the frequency ranges are selected near the odd multiples of the ¼-wave resonant frequency of the mast, then a shift is made through switch S2, S3, or S4 of the value of compensating resistor through which coupling to the sense antenna is provided.

In practice, it is usually unnecessary to provide so much complication of switching. Usually only one cable will be used for a range of frequencies, and with this cable the means for changing resistor values may be provided. Then additional selectable cables, each with appropriate resistors for the odd multiples of ¼-wave resonance, may be provided.

Referring to Fig. 7, there are shown three tuning units adapted for mounting in a turret type tuner in the dome atop the mast. The first amplifier stage of the receptor is also shown, and it may be mounted here also together with other components for translating the signal appropriately to a level where it may be easily led down the mast without introduction of phase errors on account of the lead-in conductor. If the loop is a rotating type, as here shown, the electromechanical interconnection for integrating the loop position into the sense pattern signal may be incorporated at this point in any of the known ways; for example, as shown in the aforementioned Lockhard Patent No. 2,656,536.

The tuning units of Fig. 7 include inductances L1, L2, and L3, respectively, and coupling resistors R1, R2, and R3, and alternating resistors R4, R5, and R6. Of these, R1, R2, and R3 correspond with the similarly designated resistors of Fig. 4. Resistors R4, R5, and R6 serve to adjust the overall level of sense signal voltage applied to the grids of tubes V1 and V2.

In this installation the conditions were as follows: A 3-foot mast installed at a test site found to resonate at 6.5 megacycles at ¼ wave, 13.5 megacycles at ½ wave, 20 megacycles at ¾ wave, and 28 megacycles as a full wave antenna. A length of coaxial cable was cut and adjusted in length to resonate at 13.5 megacycles ½ wave. The cable was connected as shown in Fig. 7, the ground connection to the cable being taken to the top of the mast structure. The vertical antenna was connected to one leg of the loop as shown.

"Band 5" covered the frequency range from 4 to 8 megacycles and thus included the ¼-wave resonance frequency of the mast at 6.5 megacycles. Here it was determined that resistor R1 having a value of 15 ohms brought about the appropriate reduction in mast-tip resonance voltage to yield an undistorted signal. At frequencies off the resonant frequency the resonance response of the mast and coaxial cable are reduced together and in proportion so that the correction is proportionate to the error across the band. Resistor R4 at a value of 22,000 ohms provided appropriate overall attenuation for the grid circuit employed. "Band 6" covered the frequency range from 8 to 16 megacycles. It thus included the ½-wave mast resonance point at 13.5 megacycles.

At the low end of "band 6" at 8 megacycles, the frequency was close enough to the ¼-wave resonance of the mast at 6.5 megacycles to require adjustment of the amplitude of the mast top voltage. Accordingly, it was again necessary to provide a resistance of 15 ohms in coupling resistor R2. Resistor R5 was given a value of 1,000 ohms for requisite overall attenuation.

Band 7 covered a frequency range which included full wave resonance of the mast (28 megacycles). If the mast resonance characteristic had not been this nearly ideal, it might have been necessary to use two cables of different resonant frequencies with the second cable ½ wave resonant at the full wave resonant frequency of the mast.

With this system and these values, it was possible to avoid virtually all error due to mast resonance.

It should be understood, of course, that this illustration of an actual installation is merely by way of example to show how the invention is applied in one particular instance. Other arrangements (and, of course, other values) have to be selected in accordance with the broader directions here specified in order to meet the variety of conditions met in practice and the scope of response desired.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a system for sensing and indicating the direction of the source of radiated signals, a directional antenna system comprising a loop antenna and a vertical sense antenna electrically coupled thereto to provide sensing signals for a receiver, a receiver coupled to receive said sensing signals adapted for indicating the direction of the source of the signals, said receiver having means for adjusting its frequency of response, a mast carrying at least said vertical sense antenna, and means for compensating for errors in sensing signals resulting from mast resonance comprising a length of coaxial cable having one end of its outer conductor electrically connected to the top of said mast, having the same end of its inner conductor electrically coupled to said vertical sense antenna and having the other end of said coaxial cable open.

2. In a system for sensing and indicating the direction of the source of radiated signals which includes a sense antenna mounted atop a mast, the method of correcting false sensing signals induced in the sense antenna by resonance of the mast to the radiated signal which includes tuning a length of coaxial cable by adjusting its length so that it resonates at one of the ¼-wave resonant frequencies of the mast, electrically coupling the two conductors of the coaxial cable at one end thereof respectively to the mast and to the sense antenna, and adjusting the degree of coupling to produce the desired degree of correction, such adjusting being done while receiving a signal of a frequency near one of the odd multiples of ¼-wave, mast resonant frequency.

3. In a directional antenna system comprising a mast a directional antenna and a vertical sense antenna electrically coupled thereto and mounted at the top of said mast, the improvement which comprises a coaxial cable having its internal and external conductors at one end of said coaxial cable coupled between the sense antenna and the mast, said coaxial cable being of such length that it resonates at a resonant frequency of the mast and in a sense to provide peak voltages in opposition to the peak voltages at the top of the mast whereby errors in sensing signals generated in the sense antenna system due to mast resonance are corrected.

4. In combination, a directional antenna including a loop antenna and a second antenna electrically coupled thereto to provide unambiguous sensing signals for use in indicating the direction of a source of radiated signals, a mast supporting said directional antenna system, said mast having resonant response to radiated signals whereby voltage peaks appear at the top of the mast and induce errors in the sensing signals, a coaxial cable tuned to resonate at a resonant frequency of the mast and having its outer conductor connected to the mast and its inner conductor at the same end coupled to the sense antenna through a resistor, said resistor having a value such that counterpeak voltages arising in the coaxial cable are fed to the sense antenna in an amplitude sufficient to offset aberrations in sensing signal voltage occasioned by peak voltages at the top of the mast.

5. In combination, a mast for supporting a directional antenna, said mast having an error producing resonant response to received signals, a directional antenna mounted atop the mast and including a loop antenna and a sense antenna electrically coupled thereto, a coaxial cable of a length such that it resonates at a resonant frequency of said mast, means for electrically coupling the inner and outer conductors of said coaxial cable at the same end between said mast and said directional antenna, said coupling means including a plurality of alternative resistors, each resistor having a value such that at a different odd multiple of a ¼-wave mast resonance frequency counterpeak voltages arising in the said coaxial cable will be fed to said directional antenna in an amplitude to correct error produced in signals generated in said directional antenna on account of peak voltages arising at the top of the mast, and means for connecting one or another of the alternative resistors into said coupling means.

6. In combination, a mast for supporting a directional antenna, said mast having an error producing resonant response to received signals, a directional antenna mounted atop the mast and including a loop antenna and a sense antenna electrically coupled thereto, a coaxial cable of a length such that it resonates at a resonant frequency of said mast, means for electrically coupling the inner and outer conductors of said coaxial cable at the same end between said mast and said directional antenna, said coupling means including a plurality of alternative resistors, each resistor having a value such that at a different odd multiple of a ¼-wave mast resonance frequency counterpeak voltages arising in said coaxial cable will be fed to said directional antenna in an amplitude to correct error produced in signals generated in said directional antenna on account of peak voltages arising at the top of the mast, a receptor coupled to receive signals from said directional antenna and adapted to provide an indication of the direction of the source of radiated signals, said receptor including means for selecting its reception frequency response, said last named means including means for selecting the one of said alternative resistors having a value appropriate to error correction at the odd multiple of ¼-wave frequency nearest the selected reception frequency.

7. A directional antenna system including in combination a mast having error producing resonant response to received signals whereby at different signal frequencies peaks or valleys of voltage will appear at the mast tip, the resonant response of said mast being not ideal in the sense that its resonance peak to a particular even multiple of ¼-wave resonance is not precisely at an even multiple of a lower even multiple of ¼-wave resonance peak, a directional antenna mounted atop said mast including a loop antenna and a sense antenna coupled thereto for generating sensing signals in response to received signals, a plurality of coaxial cables each tuned to resonate at a different frequency similar to that of a different even multiple of ¼-wave frequency at which said mast resonates, and means for selectively coupling one or another of said coaxial cables between said sense antenna and said mast to correct errors produced in the sensing signals by resonance response of said mast.

8. In a directional antenna system which includes a directional antenna comprising a loop antenna and a sense antenna coupled thereto and adapted for mounting atop a mast, a mast supporting at its top the directional antenna, the mast having resonant response within the intended frequency range of reception tending to introduce errors in the sensing signals generated in the sense antenna, the improvement for correcting the errors in the sensing signals arising from mast resonance which includes a coaxial cable having a length such that said coaxial cable is resonant at a mast resonant frequency in a sense to provide peaks of voltage opposing peaks of voltage arising at the mast tip, and means for coupling said coaxial cable between the top of the mast and the sense antenna whereby the errors in the sensing signals are offset and corrected.

9. In a directional antenna system which includes a directional antenna comprising a loop antenna and a sense antenna coupled thereto and adapted for mounting atop a mast, a mast supporting at its top the directional antenna, the mast having resonant response within the intended frequency range of reception tending to introduce errors in the sensing signals generated in the sense antenna, the improvement for correcting the errors in the sensing signals arising from mast resonance which includes a plurality of coaxial cables, each resonating to a different even multiple of ¼-wave frequency at which different even multiples the mast resonates, and coupling means for selectively coupling one or another of said coaxial cables between the mast tip and the sense antenna.

10. The improvement as set forth in claim 9 in which said coupling means includes adjustable resistance.

11. In a directional antenna system which includes a directional antenna comprising a loop antenna and a sense antenna coupled thereto and adapted for mounting atop a mast, a mast supporting at its top the directional antenna, the mast having resonant response within the intended frequency range of reception tending to introduce errors in the sensing signals generated in the sense antenna, the improvement for correcting the errors in the sensing signals arising from mast resonance which includes a coaxial cable resonant at at least one of the even multiples of ¼-wave resonant frequencies of the mast, and means for coupling said coaxial cable between the mast tip and the sense antenna, said means including a plurality of tuning elements for a receptor adapted and connected to receive and translate sensing signals from the sense antenna into indications of the direction of the source of received signals, each of said tuning elements being adapted to tune across a different frequency band and each including a resistor adapted for coupling said coaxial cable between the mast tip and the sense antenna, and means including circuit connections and contacts for connecting one or another of the tuning elements into the receptor circuit for tuning sensing signals from the sense antenna and for simultaneously connecting the resistor of the connected tuning unit to couple said coaxial cable to the mast tip and through the resistor to the sense antenna.

References Cited in the file of this patent

UNITED STATES PATENTS

| | | |
|---|---|---|
| 2,128,400 | Carter | Aug. 30, 1938 |
| 2,570,579 | Masters | Oct. 9, 1951 |

FOREIGN PATENTS

| | | |
|---|---|---|
| 439,714 | Great Britain | Dec. 12, 1935 |